3,190,937
PRODUCTION OF HEXENES
Alan Arthur Yeo, James Keith Hambling, and Geoffrey Winton Alderson, all of Sunbury-on-Thames, Middlesex, England, assignors to The British Petroleum Company Limited, London, England, a British joint-stock corporation
No Drawing. Filed Mar. 15, 1961, Ser. No. 95,800
Claims priority, application Great Britain, Mar. 23, 1960, 10,368/60; July 15, 1960, 24,723/60; Aug. 25, 1960, 29,375/60; Nov. 22, 1960, 40,049/60
The portion of the term of the patent subsequent to Apr. 2, 1980, has been disclaimed
1 Claim. (Cl. 260—683.15)

This invention relates to a process for the dimerisation of propylene to obtain a methylpentene-2. In particular it relates to a process for the production of 2-methylpentene-2 and/or 4-methylpentene-2.

In British patent specification 824,917 is disclosed a process for dimerising propylene to a hexene product consisting of hexene isomers which comprises reacting propylene in the presence of an alkali metal catalyst at a temperature of from 100° F. to 400° F. and a pressure of from 1 atmosphere to 100 atmospheres. It is stated that the catalyst may be a liquid metal catalyst, metal in a film on an inert support, or a solid metal catalyst. It is stated, in accordance with a specific example, that by the use of a catalyst consisting of potassium metal dispersed on potassium carbonate, an 80% conversion of propylene to hexene is obtained. However the main product obtained was stated to be 4-methylpentene-1; yields of 2-methylpentene-2 and 4-methylpentene-2 were low being, in total, of the order of 10–17% based on total hexene in the product.

In British patent specification 825,902 it is disclosed that compounds of alkali metals with elemental carbon, the ratio of alkali metal to carbon being 1:8 to 1:64, act as polymerisation agents and in illustration there is described the polymerisation of alpha-methylstyrene to high molecular weight products using a catalyst of the formula $KC_8$.

We have now found that by the use of a complex sodium and carbon as catalyst, propylene can be polymerised to give high yields of specific hexenes and, in particular, high yields of either 2-methylpentene-2 or of 4-methylpentene-2 according to the process conditions selected.

Thus according to this invention there is provided a process for the production of a methylpentene-2 which comprises maintaining propylene in contact with a catalyst consisting of or containing a lamellar complex of sodium and carbon and having the formula $NaC_{64}$.

Usually the reaction temperature will be of the order of 160° C. When 4-methylpentene-2 is desired as the main product the reaction temperature should be in the range 140–160°. When 2-methylpentene-2 is desired as the main product the reaction temperature should be above 160° C.; preferably the temperature will be below 180° C.

In general it is not desirable to employ reaction temperatures below 140° C.; if such temperatures are used short contact times of product with catalyst should be avoided in order to reduce the yield of 4-methylpentene-1.

The production of lamellar complexes of alkali metals and carbon is described by R. C. Asher and S. A. Wilson in Nature, 1958, vol. 181, at page 409 et seq., and by R. C. Asher in J. Inorg. Nucl. Chem., 1959, vol. 10, at page 238 et seq.

Usually a pre-formed complex of the type hereinbefore described will be brought into contact with propylene; this is not essential if the polymerisation conditions are such that the complex will form in situ and in this case a mixture of sodium and carbon may be contacted with propylene.

The catalyst may consist wholly of the lamellar complex or may consist of or contain a mixture of the lamellar complex with an alkali metal supported on carbon, said mixture containing the lamellar complex in any proportion. The proportion of the catalyst existing as lamellar complex will be determined, at least in part, by the nature of the carbon employed and by the relative proportions of alkali metal and carbon. Furthermore, if desired, the catalyst may contain free carbon.

In general it is desirable to use as catalyst a mixture of the lamellar complex of sodium and carbon of formula $NaC_{64}$ together with sodium metal. This mixture may be obtained by heating together a mixture of sodium metal and carbon containing an excess of sodium metal over the amount required to form $NaC_{64}$. By the use of catalysts containing a mixture of the lamellar complex with sodium metal very satisfactory values for catalyst life are obtained. The catalyst may be free of elements other than sodium and carbon; if desired trace amounts of elements or compounds of elements which favour isomerisation under the polymerisation conditions may be incorporated. Suitable elements are aluminium, silica and iron; these may be present in the graphite used for forming the catalyst. Essentially the structure of the complex will be that of a lamellar complex of only sodium and carbon.

The carbon will preferably be wholly or partly in the form of natural or synthetic graphite. However, other forms of carbon may be employed providing that they are capable of reacting with an alkali metal to form a lamellar complex. Thus there may be employed forms of carbon which contain graphite in microcrystalline form together with carbon of a nature which does not form lamellar complexes with alkali metals.

Usually the reaction pressure will be superatmospheric, preferably being in the range 50 to 4000 lbs./sq. in. gauge. The combination of polymerisation conditions employed will be selected according to the nature of the product required.

The process may be carried out either in the presence or absence of a solvent. Preferred solvents are hydrocarbons, for example normally liquid paraffins; normal heptane is a particularly suitable solvent.

Preferably the propylene employed as feedstock will be free of water. In general, the propylene should have a water content not greater than 0.001% wt.; in comparison with a process using propylene saturated with water the improvement in yield of propylene dimer, using suitable reaction conditions is usually quite marked and in certain cases may be as much as 30% by weight.

It will be apparent that it is essential to avoid conditions which would lead to the presence of a slug of water in liquid phase reaching the polymerisation catalyst.

Preferably the propylene employed as feedstock will be free of allene and of methylacetylene. In general, if these compounds are present they should constitute in total less than 0.02% by weight of the propylene.

Preferably compounds employed as feedstock for the process of this invention are treated, before use, for the reduction of allene and/or methylacetylene content by selective hydrogenation over a supported nickel catalyst, for example nickel-on-sepiolite.

The propylene should be free of oxygen; if present it should not constitute more than 5 p.p.m. by weight based on propylene.

If desired the propylene may be employed in the presence of a gas which is inert under the conditions of the reaction. Thus nitrogen, methane, ethane or propane may be present in the feedstock.

The reaction may be carried out batchwise or continuously.

The catalyst may be employed as a fixed bed, a fluidised bed or as a slurry in solvent or in one or more of the reaction products.

According to one aspect of this invention there is provided a process which comprises maintaining propylene in contact with a catalyst consisting of or containing a lamellar complex of sodium and carbon and having the formula $NaC_{64}$ at a temperature not less than 130° C., recovering from the product a $C_6$ fraction and recovering, from the $C_6$ fraction, 2-methylpentene-2, 4-methylpentene-2 or both.

Product recovery will usually be achieved by distillation. Usually distillation will be carried out in a column of at least 60 theoretical plates, suitably circa 100 theoretical plates.

The invention is illustrated but not limited with reference to the following example.

EXAMPLE 1

Graphite (128 grams, 10.7 gram atoms) was dried at 400° C. and 0.1 mm. for 30 minutes. The heating was continued at 400° C. under an atmosphere of pure dry nitrogen and to the sitrred graphite was added sodium (3.8 grams, 0.166 gram atom). Reaction under these conditions for 30 minutes was found to be sufficient to prepare the catalyst.

The catalyst was charged to a three litre rocking autoclave which was heated to 160° C. and then pressured to 1800 lbs./sq. in. gauge with pure dry propylene. The temperature and pressure were held constant at the above figures throughout the reaction period of 20 hours.

At the end of the reaction the products were distilled from the autoclave and the unreacted propylene was removed by evaporation. The yield of hexanes obtained from the residue by distillation was 360 grams, 4.3 moles, and comprised 96% of the reacted propylene.

The isomers described below were shown to be present in the hexene fraction:

| | Percent by weight |
|---|---|
| 4-methylpentene-1 | 21 |
| 4-methylpentene-2 | 56 |
| 2-methylpentene-1 | 3 |
| 2-methylpentene-2 | 18 |
| n-Hexenes | 2 |

EXAMPLE 2

The process described in Example 1 was repeated except that the reaction was carried out under continuous conditions at lower temperature.

The catalyst was charged to a stainless steel reactor to form a cylindrical bed 20 cms. in length and of 4 cms. diameter. The reactor was operated in vertical downflow using propylene at 1500 lb./sq. in. gauge, reaction temperature and flow rate being varied in different runs as shown in the following table.

*Table*

| Run No. | 1 | 2 | 3 |
|---|---|---|---|
| Reaction Conditions: | | | |
| Temperature (° C.) | 156 | 154 | 126 |
| Liquid hourly space velocity | 0.416 | 0.33 | 0.416 |
| Product Analysis: | | | |
| 4-methylpentene-2 | 63.0 | 65.4 | 43.9 |
| 2-methylpentene-2 | 9.2 | 8.7 | 3.8 |
| 4-methylpentene-1 | 25.8 | 23.7 | 51.3 |

Run No. 3 is given for purposes of comparison and does not constitute operation according to the present invention.

EXAMPLE 3

The process described in Example 1 was repeated except that (a) there was used a "high ash" graphite in the production of the catalyst; ash content of the graphite was 0.6% by weight and (b) reaction with propylene was carried out at 165° C. and a pressure of 1500 lbs./sq. in. gauge.

The yield of hexenes was 230 grams and analysis showed the presence of:

| | Percent by weight |
|---|---|
| 4-methylpentene-1 | 1.8 |
| 4-methylpentene-2 | 25.0 |
| 2-methylpentene-2 | 58.0 |
| 2-methylpentene-1 | 10.0 |
| n-Hexenes | 5.2 |

It is an advantage of the process of the present invention that high selectivity, for the required hexene isomer, may be attained.

According to another aspect of this invention there is provided a novel catalyst, suitable for use in polymerisation reactions, comprising a mixture of a lamellar complex of sodium and carbon, of formula $NaC_{64}$, together with metallic sodium, as hereinbefore described.

We claim:

A process for the production of 2-methylpentene-2 comprising; contacting propylene with a catalyst consisting essentially of a lamellar complex of sodium and graphite and having the formula $NaC_{64}$, at a temperature of at least 160° C., and recovering 2-methylpentene-2 from the $C_6$ fraction of the product.

References Cited by the Examiner

UNITED STATES PATENTS

| 2,881,234 | 4/59 | Esmay et al. | 260—683.15 |
| 2,965,624 | 12/60 | Anderson | 260—94.2 |
| 2,986,588 | 5/61 | Schramm | 260—683.15 |
| 3,084,206 | 4/63 | Yeo et al. | 260—683.15 |

FOREIGN PATENTS 825,902  12/59  Great Britain.

OTHER REFERENCES

Moeller, "Inorganic Chemistry," John Wiley & Sons, Inc., New York, 1952, page 668 relied on.

Asher et al., "Nature," vol. 181 (1958), pages 409–410.

ALPHONSO D. SULLIVAN, *Primary Examiner.*